United States Patent
Liang et al.

(10) Patent No.: US 9,456,410 B2
(45) Date of Patent: Sep. 27, 2016

(54) METHOD FOR SUPPORTING PDN GW SELECTION

(75) Inventors: Huarui Liang, Beijing (CN); Hong Wang, Beijing (CN); Lixiang Xu, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 13/319,433

(22) PCT Filed: May 7, 2010

(86) PCT No.: PCT/KR2010/002898
§ 371 (c)(1),
(2), (4) Date: Nov. 8, 2011

(87) PCT Pub. No.: WO2010/128815
PCT Pub. Date: Nov. 11, 2010

(65) Prior Publication Data
US 2012/0063437 A1    Mar. 15, 2012

(30) Foreign Application Priority Data

May 8, 2009 (CN) .......................... 2009 1 0138192

(51) Int. Cl.
*H04W 48/20* (2009.01)
*H04W 48/16* (2009.01)
*H04W 48/02* (2009.01)
(Continued)

(52) U.S. Cl.
CPC ............. *H04W 48/20* (2013.01); *H04W 8/082* (2013.01); *H04W 48/02* (2013.01); *H04W 48/16* (2013.01); *H04W 76/026* (2013.01);
(Continued)

(58) Field of Classification Search
CPC .......................... H04W 74/004; H04W 76/026
USPC .......................... 370/230, 235, 236, 329, 341
See application file for complete search history.

(56) References Cited

U.S. PATENT DOCUMENTS

2008/0254768 A1* 10/2008 Faccin .......................... 455/411
2008/0285492 A1   11/2008 Vesterinen
(Continued)

FOREIGN PATENT DOCUMENTS

EP          2407004 A1    1/2012
KR    10-2008-0112946 A   12/2008
(Continued)

OTHER PUBLICATIONS

Samsung: "local IP access to Internet" 3GPP Draft; S2-09254, 3rd Generation Partnership Project (3GPP), Mobile Competence Centre; 650, Route Des Lucioles; F-06921 Sophia-Antipolis Cedex; France, no. Hangzhou; Mar. 24, 2009, XP050345376, Mar. 24, 2009.

(Continued)

*Primary Examiner* — Redentor Pasia
(74) *Attorney, Agent, or Firm* — Jefferson IP Law, LLP

(57) ABSTRACT

A method for supporting PDN GW selection, comprising the following steps of: receiving by an MME a local route optimization service request information; searching by the MME the IP address of a PDN GW which supports local route optimization according to the IP address of a PDN GWh; sending by the MME a bearer request establishment message to the PDN GWh. The method of the present invention can ensure core network equipment to find PDN GW correctly while HeNB system supports local route optimization.

20 Claims, 12 Drawing Sheets

(51) Int. Cl.
*H04W 76/02* (2009.01)
*H04W 8/08* (2009.01)
*H04W 48/08* (2009.01)
*H04W 84/04* (2009.01)
*H04W 48/00* (2009.01)
*H04W 80/04* (2009.01)

(52) U.S. Cl.
CPC ............ *H04W 48/08* (2013.01); *H04W 48/17* (2013.01); *H04W 80/04* (2013.01); *H04W 84/045* (2013.01)

(56) References Cited

U.S. PATENT DOCUMENTS

| | | | | |
|---|---|---|---|---|
| 2008/0316971 | A1* | 12/2008 | Shaheen | 370/331 |
| 2009/0047947 | A1* | 2/2009 | Giaretta et al. | 455/432.1 |
| 2009/0232019 | A1* | 9/2009 | Gupta et al. | 370/252 |
| 2010/0240397 | A1* | 9/2010 | Buchmayer et al. | 455/456.1 |
| 2011/0182244 | A1 | 7/2011 | Liang et al. | |
| 2012/0002608 | A1* | 1/2012 | Vesterinen et al. | 370/328 |
| 2012/0076047 | A1* | 3/2012 | Turanyi et al. | 370/254 |

FOREIGN PATENT DOCUMENTS

| | | |
|---|---|---|
| RU | 2199190 C2 | 2/2003 |
| RU | 2310903 C2 | 11/2007 |
| WO | 2010-035971 A2 | 4/2010 |

OTHER PUBLICATIONS

QUALCOMM Europe: "Local IP access baseline solution for EHNB", 3GPP Draft; S2-092308, 3rd Generation Partnership Project (3GPP), Mobile Competence Centre; 650, Route Des Lucioles; F-06921 Sophia-Antipolis Cedex; France, no. Hangzhou; Mar. 24, 2009, XP05345597, Mar. 24, 2009.

NEC: "Architecture alternative for Local IP access", 3GPP Draft; S2-091989 Local IP Access to Home, 3rd Generation Patrnership Project (3GGP), Mobile Competence, 650, Route Des Lucioles; F-06921 Sophia-Antipolis Cedex; France, no. Hangzhou; Mar. 24, 2009, XP050345321, Mar. 24, 2009.

Nokia Siemens Networks et al: "Local GW functionality for LIPA and related control functionality", 3GPP Draft; S2-093507 (Local_IP_ACCESS—GWFunctions & Control) V3, 3rd Generation Partnership Project (3GPP), Mobile Competence Centre; 650, Route Des Lucioles; F-06921 Sophia-Antipolis Cedex; France, no. Tallinn, May 5, 2009, XP050346576, May 5, 2009.

Alcatel-Lucent, On HNB and HENB interfaces for LIPA, May 11-15, 2009.

Ericsson, on Local IP Access, 3GPP TSG-SA WG2#73, 3GPP, S2-093523, May 5, 2009.

Alcatel-Lucent, On HNB and HeNB interfaces for LIPA, 3GPP TSG-SA WG2# 73, 3GPP, S2-093378, May 5, 2009.

"3rd Generation Partnership Project; Technical Specification Group Services and System spects; General Packet Radio Service (GPRS) enhancements for Evolved Universal Terrestrial Radio Access Network (E-UTRAN) access (Release 8)", 3GPP Standard; 3GPP TS 23.401, 3rd Generation Partnership Project (3GPP), Mobile Competence Centre; 650, Route Des Lucioles; F-06921 Sophia-Antipolis Cedex; France, No. V8.5.0,1, pp. 1-223, XP050363628, Mar. 1, 2009.

"3rd Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release 8)", 3GPP Standard; 3GPP TS 36.300, 3rd Generation Partnership Project(3GPP), Mobile Competence Centre; 650, Route Des Lucioles; F-06921 Sophia-Antipolis Cedex; France, No. V8.8.0,1, pp. 1-157, XP050377583, Mar. 1, 2009.

* cited by examiner

METHOD FOR SUPPORTING PDN GW SELECTION

TECHNICAL FIELD

The present invention relates to the filed of communications, and in particularly to a method for selecting PDN GW supporting HeNB local route optimization.

BACKGROUND ART

The structure of SAE system is illustrated in FIG. 1. The following is a description of the structure of the SAE system in FIG. 1.

101 User Equipment (UE) is a terminal device to receive data. 102 EUTRAN is a radio access network in the evolved system SAE, including a macro base station (eNB), which is responsible for providing a radio network access interface for LTE mobile phones, and is connected with the mobile management entity MME 103 and the user plane entity 104 Serving Gateway (S-GW) of the mobile phones through the interface S1 . 103 MME is responsible for managing UE's mobile context, session context, and saving user security information. 104 Serving Gateway primarily offers the functions in the user plane. The interface S1 -MME is responsible for establishing radio access bearer for UE, forwarding the messages sent from UE to MME through the radio access network. The combined function of 103 MME and 104 Serving Gateway is similar to that of the original 108 SGSN (General Packet Radio Service (GPRS) supporting node). And it is possible that both MME and Serving Gateway could locate at the same physical entity. 105 PDN Gateway (PDN GW) is responsible for functions such as charging and legal listening. Both the Serving Gateway and the PDN Gateway may locate at the same physical entity. 108 SGSN offers routing for data transmission in the existing UMTS. The existing SGSN finds corresponding Gateway GPRS Supporting Nodes (GGSN) according to a Access Point Name (APN). 109 HSS is a home subscription sub-system for subscribers, which is responsible for saving subscriber information, such as the UE's current location, the serving node's address, subscriber security information, UE's activated packet data protocol (PDP) context and so on. 106 PCRF offers QoS policy and charging rules through interface S7.

As shown in FIG. 2, the current HeNB system exists in 102 E-UTRAN. The current HeNB system has two possible architectures. One is that HeNB exists in E-UTRAN as a separate access equipment and the other is that two pieces of access equipment HeNB and HeNB GW exist in the E-UTRAN system. HeNB GW has less equipment and is used to manage a plurality of HeNBs. From the perspective of a core network, HeNB and HeNB GW can be regarded as the existing eNB, but the interface from HeNB GW or HeNB to the core network is the same as that of the existing SAE system. HeNB is deployed in a subscriber's home. If HeNB-GW exists in a HeNB system, it is deployed in the operator's network.

HeNB supports local route optimization function, including a direct access from UE to Internet through HeNB or a direct access from UE to other electronic equipments in the subscriber's home through HeNB, rather than through any core network node. This provides the advantage of reducing routing of subscriber data. When HeNB GW exists, the local route optimization function is still accessed to Internet through HeNB. There is no need to waste resources of the fixed network through HeNB GW.

In order to support the HeNB local route optimization function, the system architecture of the existing HeNB shall be enhanced. Since there are various possibilities, the architecture has not yet been finalized and only some basic principles are finalized, which include that HeNB needs to have the function of PDN GW (the PDN GW on HeNB, hereinafter referred to as PDN GWh for short). However, when the local route optimization service is activated, MME cannot correctly find a route to the PDN GW on HeNB according to the existing methods for finding PDN GW. Therefore, the present patent proposes an effective method for finding PDN GW.

In order to support the HeNB local route optimization function, there are several possibilities as follows:

Possibility 1: the HeNB network entity needs to have functions of Serving GW and PDN GW. When UE activates any other non-local route optimization service, it is necessary for the user plane routing requiring this service to pass through the Serving GW of the core network, rather than the Serving GW on HeNB while passing through the core network equipment. In such circumstances, there are two Serving GWs for the same UE network;

Possibility 2: the HeNB network entity has functions of Serving GW and PDN GW and when UE needs to activate any other non-local route optimization service, it is necessary for the user plane routing requiring this service to pass through the Serving GW on HeNB while passing through the core network equipment.

Possibility 3: the HeNB network entity has functions of Serving GW, PDN GW and MME. In this case, when the local route optimization service is activated, it is unnecessary for a signaling of the control plane to go to MME of the operator's network. In the circumstances, it not only saves the data routing of the user plane but also saves the signaling of the control plane.

DISCLOSURE OF INVENTION

Technical Problem

Regarding the above possibilities, there is a problem that how MME can correctly finds the address of PDN GW. This patent application only take Possibility 1 as an embodiment of the present invention. Other possible architectures still can apply the methods included in this patent application.

Solution to Problem

The present invention is to provide a method which supports finding PDN GW in an HeNB system.

A method for supporting PDN GW selection comprises the following steps of:

receiving by an MME a local route optimization service request information;

searching by the MME the IP address of a PDN GW which supports local route optimization according to the IP address of a PDN GWh;

sending by the MME a bearer request establishment message to the PHN GWh.

Advantageous Effects of Invention

With the method of the present invention, it is ensured that the core network equipment can correctly find PDN GW while the HeNB system provides local route optimization.

MODE FOR THE INVENTION

Figure 1:
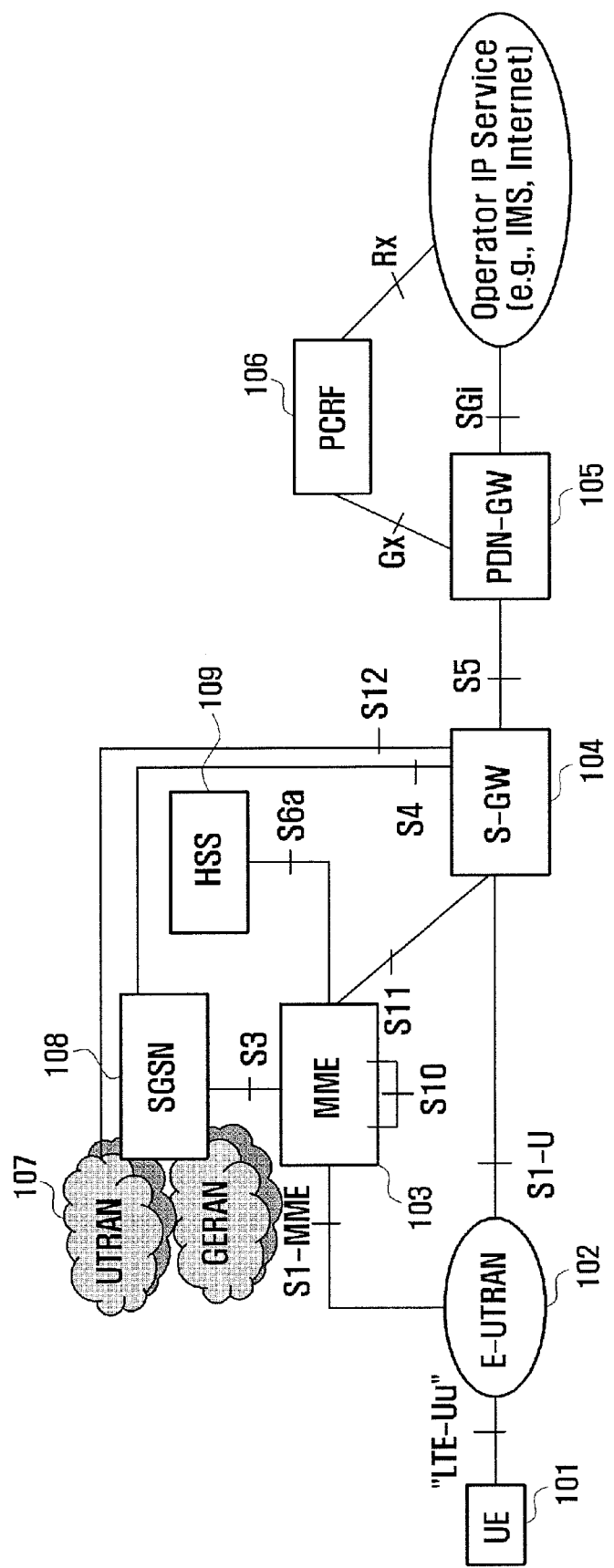
FIG. 1 shows the network structure of the SAE system.
Figure 2:
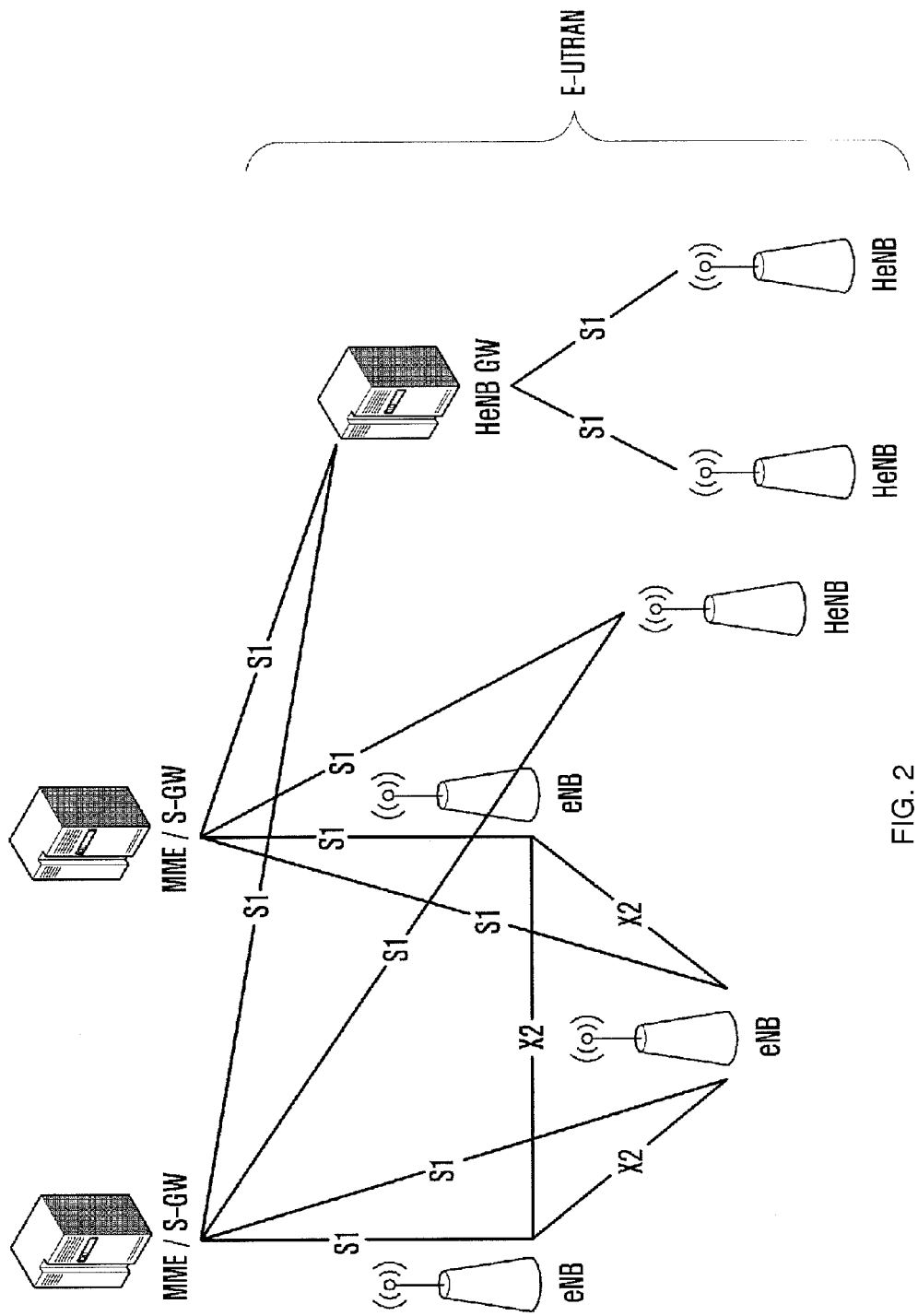
FIG. 2 shows the network structure of the HeNB system.
Figure 3:
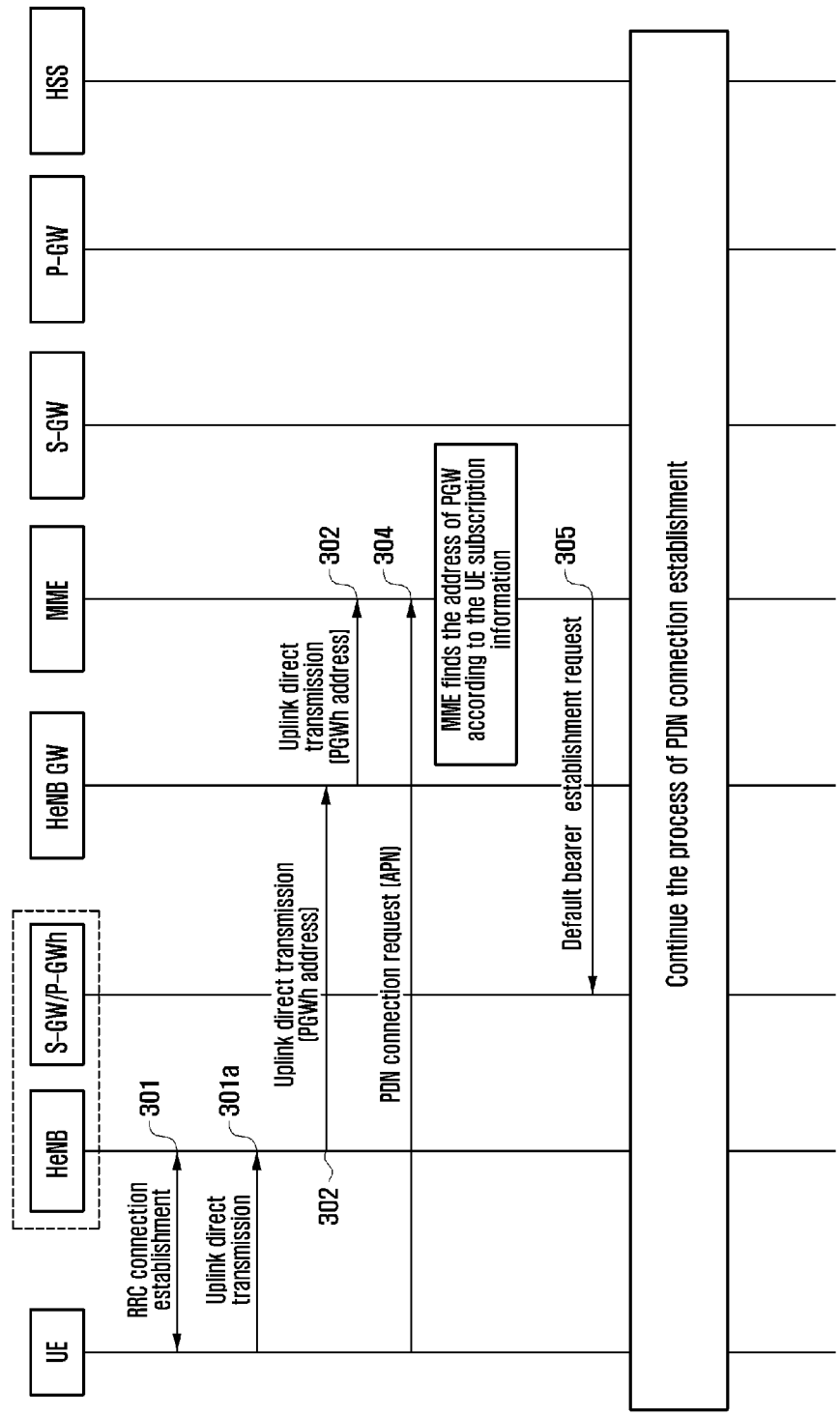
FIG. 3 shows Embodiment 1: PDN connection establishment process.

In Embodiment 1 of the present invention UE requests for establishing a local route optimization service, and a PDN connection process of the UE request is shown in FIG. 3.

The following is the detailed description of this figure. And the detailed technical description of any technology unrelated to the present invention is omitted in the following.

301. RRC connection establishment process

301a UE sends an NAS message to HeNB through an uplink direct transmission.

302. HeNB sends S1 message via uplink direct transmission to HeNB GW, wherein the message needs to include address information of PDN GWh, or of S-GWh and PDN GWh (S-GWh and PDN GWh refers to S-GW and PDN GW located on HeNB, and is used to distinguish them from S-GW and PDN GW in the core networks). Furthermore, the message also includes information about whether HeNB has the ability to support local route optimization. If there is no HeNB GW, HeNB will send the message directly to MME.

If MME acquires the address of PDN GWh, or of S-GWh and PDN GWh and the information about whether HeNB has the ability to support local route optimization through the initial UE message during network attaching before the activation of local route optimization service, the information via uplink direct transmission does not need to carry the address of PDN GWh, or of S-GWh and PDN GWh and the information about whether HeNB has the ability to support local route optimization.

303. HeNB GW sends S1 message via uplink direct transmission to MME, wherein the message needs to contain address information of PDN GWh. HeNB reports to MME information about whether it supports local route optimization.

304. For the UE, MME receives PDN connection establishment request in the form of NAS message after S1 connection has been established successfully. The message may contain APN information requested by UE. The PDN connection establishment request in a form of NAS message functions as a request message for activating the local route optimization.

MME has UEs' subscription information saved on it, wherein information of APN and PDN GW ID are contained. And APN information requested by UE contains the type of the service requested by UE, such as a local route optimization service. MME verifies APN of the request according to the subscription information of UE, and then it starts searching PDN GW address when the subscription information of UE contains the local route optimization service. Otherwise, MME refuses the PDN connection request and suspends the following processes if its verification fails. Another way in which MME decides whether or not to permit PDN connection for UE request is that: UE is permitted to access the local route optimization service only if UE is a member in HeNB group and HeNB can support the local route optimization service. MME can also verify that whether UE has applied for the local route optimization service in other ways, while the invention will still applicable. Since the service UE requests is a local route optimization service, MME needs not to search appropriate PDN GW for the UE in the way of PDN GW ID+APN, but can conduct it through the address of PDN GWh carried on S1 message.

Figure 9:
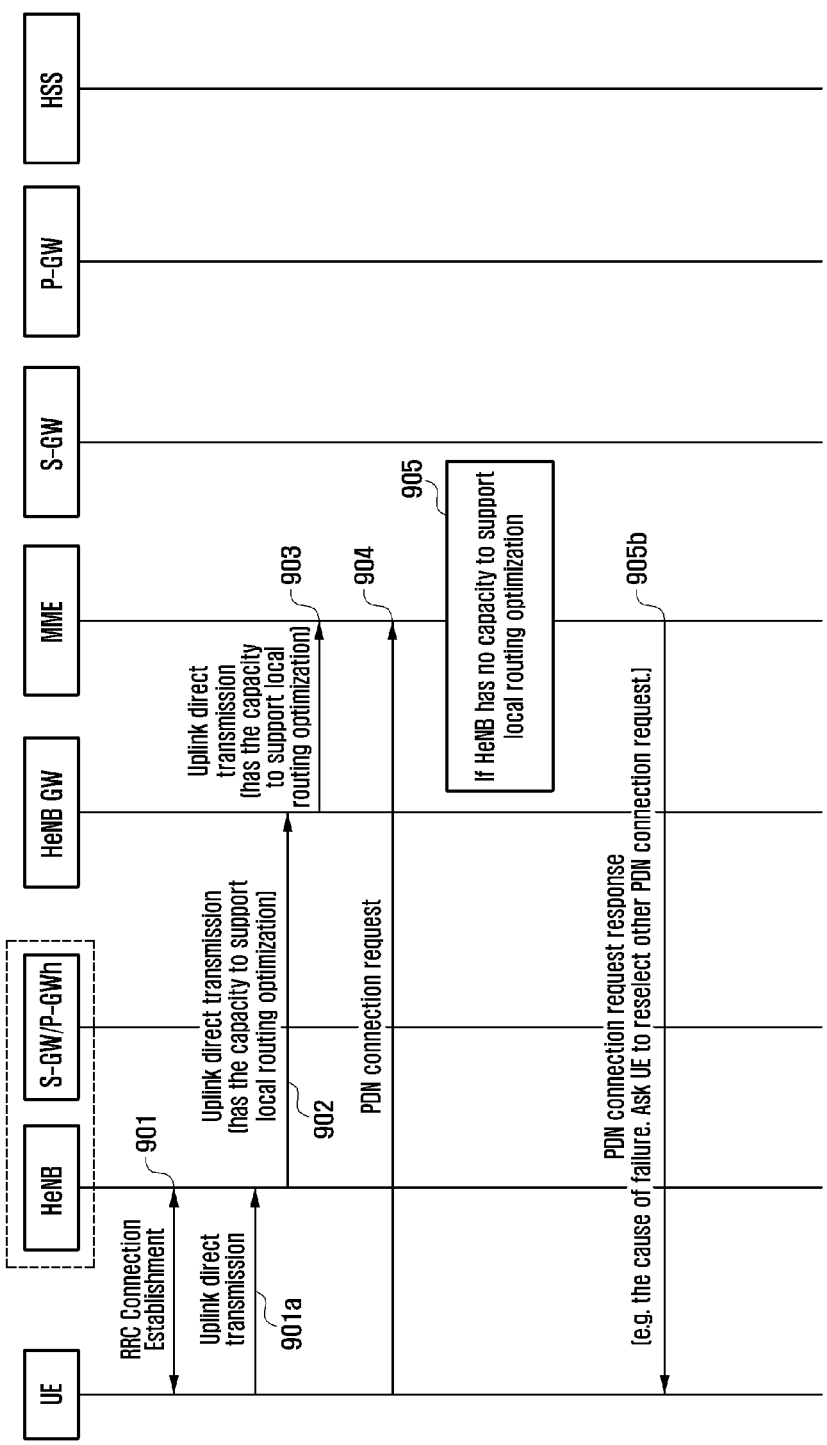
FIG. 9 shows Embodiment 7: PDN connection establishment process.

Note that, as one implementation mode of the invention, MME refuses to process the activation request of the local route optimization applied by UE, if the HeNB is incapable of supporting local route optimization (as Embodiment shown in FIG. 9). And as another implementation mode of the invention, MME establishes bearer(s) for the service UE applies in common service mode (without local route optimization, but communication over the core network).

MME searches appropriate PDN GW for UE according to the saved default APN information, if the PND connection request does not contain APN information. MME searches PDN GW according to acquired PDN GWh address information if the default APN contains information about local route optimization service. Otherwise, MME will search for PDN GW address by normal processes.

305. MME sends a default bearer establishment request message to PDN GWh according to the address of PDN GWh.

All of the subsequent processes are omitted in the description, for they are the same as the existing ones.

Figure 4:
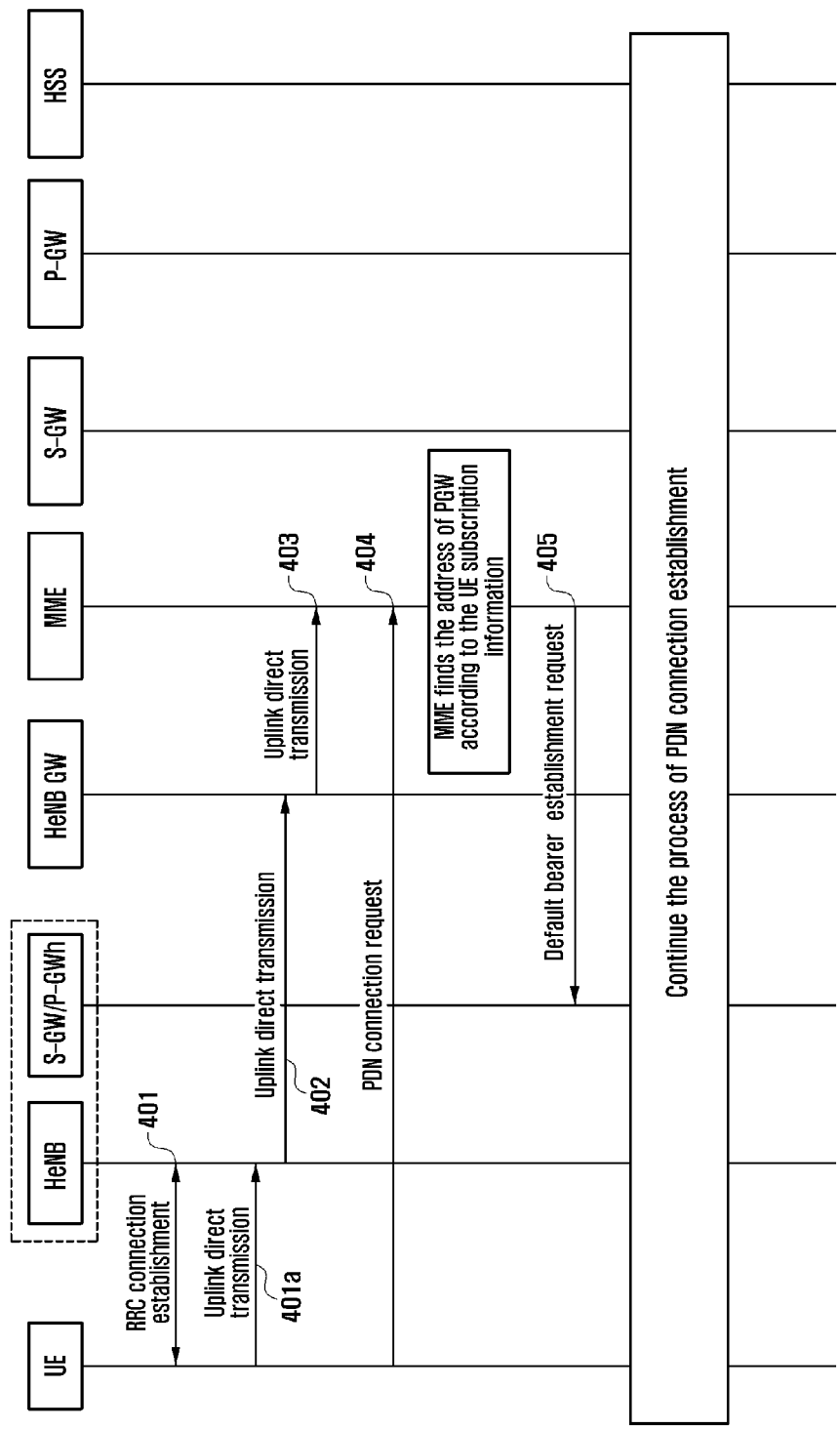
FIG. 4 shows Embodiment 2: PDN connection establishment process.

Embodiment 2 of the present invention shows that UE requests to establish a local route optimization service, and shows a PDN connection requested by UE. And detailed technical description of technology unrelated to the present invention is omitted in FIG. 4.

401. RRC connection establishment process

401a. UE sends a NAS message via uplink direct transmission to HeNB.

402. HeNB sends an S1 message via uplink direct transmission to HeNB GW, wherein the message contains information about whether HeNB possesses the ability of supporting local route optimization. HeNB directly sends the message to MME if HeNB GW is absent.

403. HeNB GW sends an S1 message via uplink direct transmission to MME, and HeNB reports to MME about whether it is capable of supporting local route optimization.

404. For the UE, MME receives PDN connection establishment request in the form of NAS message after the S1 connection has been established successfully. The message may contain APN information UE requests.

405. The subscription information stored in HSS contains APN and corresponding

PDN GW ID. The service operator can select to directly configure IP address of PDN GWh in PDN GW ID of APN corresponding to the local route optimization service and contained in HeNB, or select to store S-GW and PDN GWh existing in the subscription information in other forms for the signed-in subscriber of HeNB if UE has subscribed with local route optimization service. MME can directly find PDN GWh according to the PDN GWh IP address contained in PDN ID which is acquired from HSS or S-GWh/PDN GWh in other subscription information during MME's selection of the appropriate PDN GW.

Note that, as an implementation mode of the invention, MME refuses to process the activation request of the local route optimization requested by UE if said HeNB does not possess the capability of supporting local route optimization (as the embodiment shown in FIG. 9). And as another implementation mode of the invention, MME establishes bearer(s) for the service requested by UE in a common service mode.

The following processes are same as those of Embodiment 1.

Figure 5:
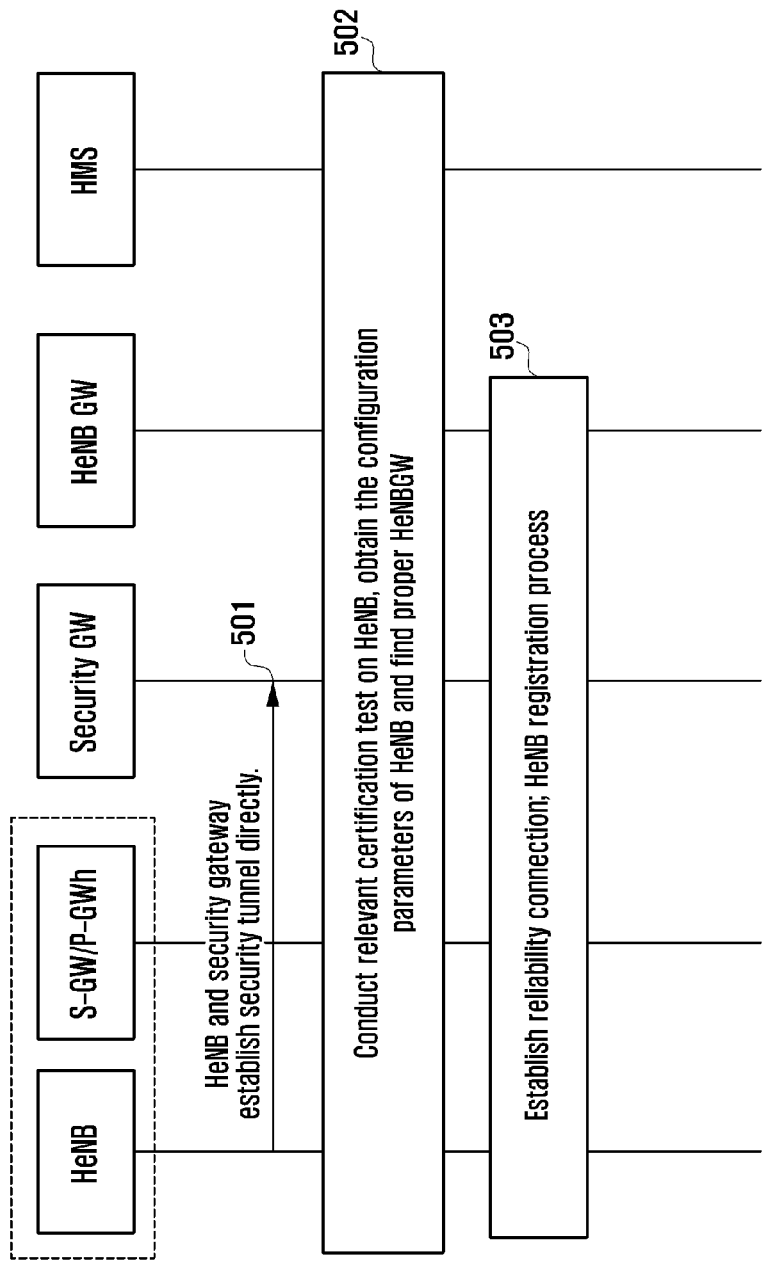
FIG. 5 shows Embodiment 3: HeNB power-on process.

The Power-on process of Embodiment 3 of the present invention is as shown in FIG. 5. The following is the detailed description of this figure. And detailed technical description of technology unrelated to the present invention is omitted in the following.

501 HeNB will directly establish secure tunnel with the security gateway after Powered-on, and then the security gateway assigns IP address to HeNB after the tunnel has been established, wherein the IP address is an internal IP address of the operator network and it cannot be accessed by any external equipment.

502. HeNB exchanges information mutually with its HeNB Management system (HMS), and then HMS verifies HeNB, provides it with configuration parameters for the authentic HeNB and searches appropriate HeNB GW for it, if it is authentic. HMS can acquire SGWh/PDN GWh IP address assigned for the HeNB through other OAM (Operator Administration and Maintenance) equipments during the process. And MME needs to save the corresponding SGWh/PDN GWh IP address assigned for this HeNB.

503. Registration process of HeNB.

Figure 6:
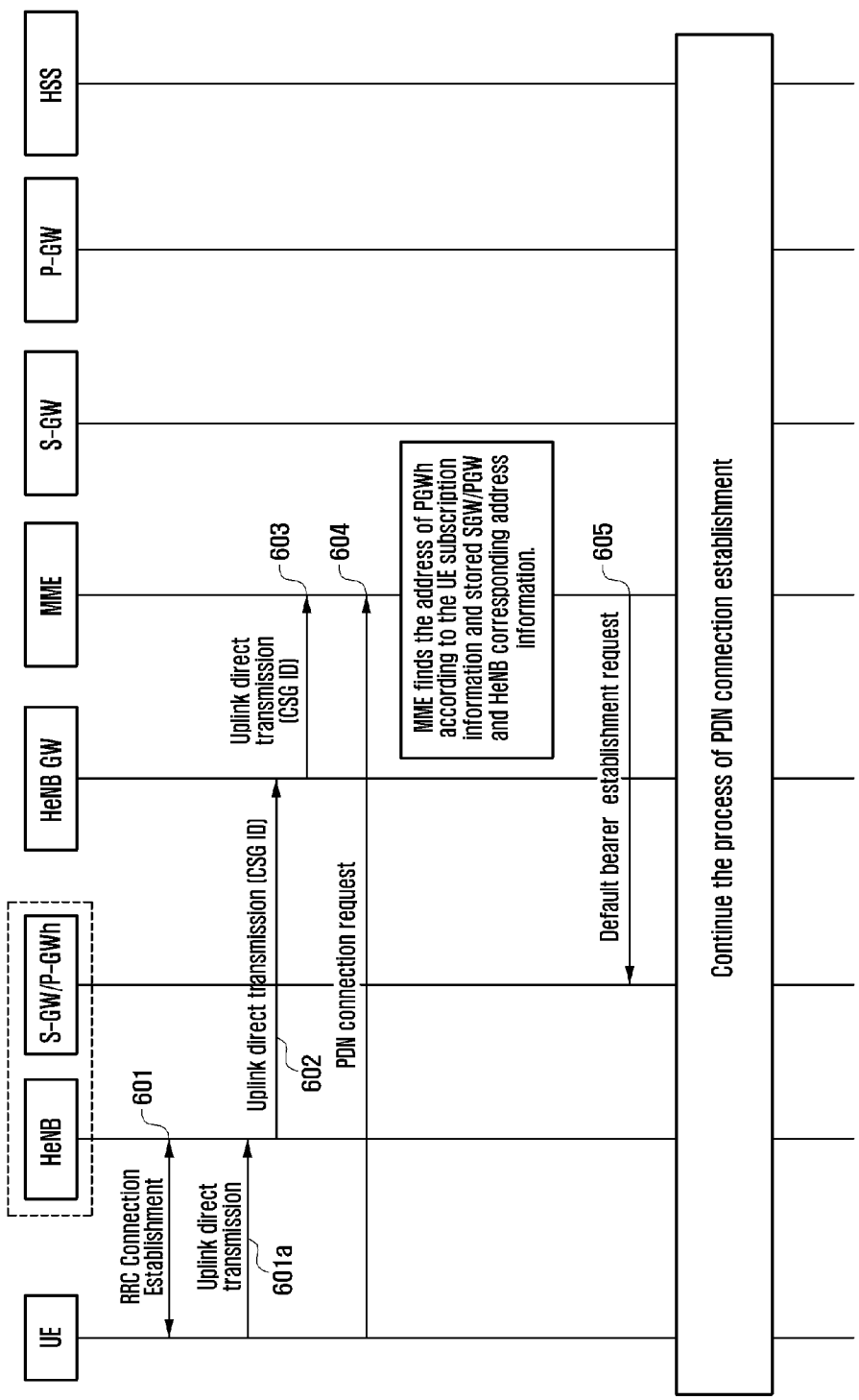
FIG. 6 shows Embodiment 4: PDN connection establishment process.

Embodiment 4 of the present invention shows that UE requests to establish a local route optimization service, and shows a PDN connection requested by UE. As shown in FIG. 6, detailed technical description of technology unrelated to the present invention is omitted in the following.

601-604 is the same as those in Embodiment 2.

MME saves correspondence relationship between the HeNB which supports a local route optimization service and the pre-configured PDN GWh's IP address, in which the identifier of HeNB could be HeNB ID or CSG ID as well, or information such as IP address and so on, and only such ID can identify the HeNB exclusively. During the power on and registration process of HeNB, MME can tell the security gateway and other equipments the pre-configured PDN GWh/SGWh address through OAM equipments and so on, to guarantee that the address pre-configured in MME is assigned for the SGWh/PDN GWh which serves the UE during activation of local route optimization service.

When MME receives PDN connection request of UE, and the request contains information of local route optimization service, the MME will verify the request at first, and then find corresponding IP address of SGWh/PDN GWh according to ID of the HeNB, if the request passes verification.

Note that, as an implementation mode of the invention, MME refuses to process the activation request of the local route optimization requested by UE if said HeNB is unable to support local route optimization (as the embodiment shown in FIG. 9). And as another implementation mode of the invention, MME establishes bearer(s) for the service UE applies in common service mode.

605. MME sends a default bearer establishment request according to PGW address information.

All of the subsequent processes are the same as those in Embodiments 1 and 2.

Embodiments 1, 2, 3, 4 and 8 show four methods of searching PDN GW in the condition that local route optimization function is supported. The four methods may be substitutes for each other.

Figure 7:
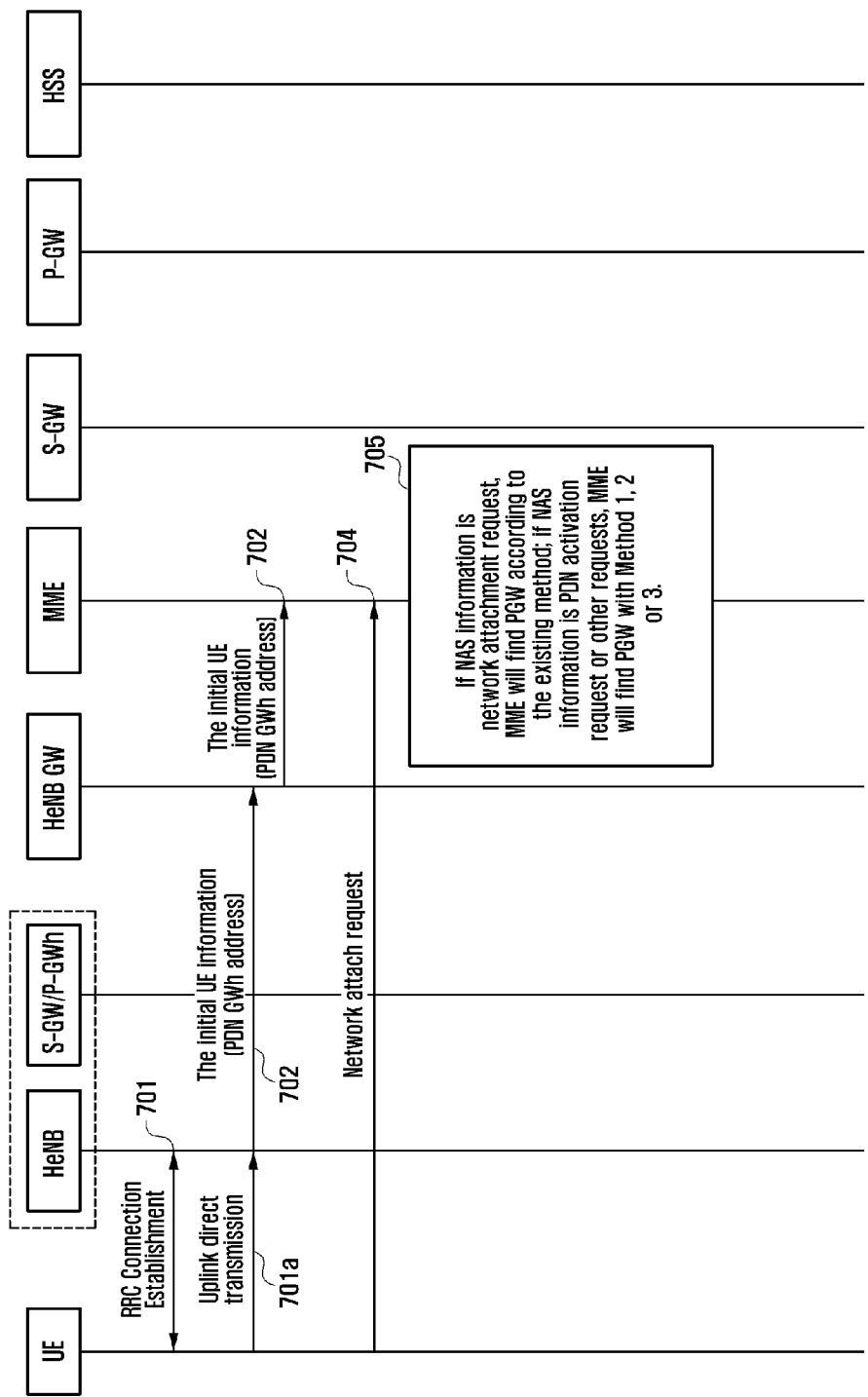
FIG. 7 shows Embodiment 5: initial access process.

Embodiment 5 of the present invention shows a network attaching process. As shown in FIG. 7, detailed technical description of technology unrelated to the present invention is omitted in the following.

701 RRC Connection Establishment

701a. UE sends NAS message via uplink direct transmission to HeNB.

702. UE message is initiated, which carries address information of PDN GWh on HeNB which supports local route optimization.

If UE executes attaching process first, and then executes connection of multiple PDN in order to activate local route optimization service, the message via uplink direct transmission during the connection of multiple PDN can carry no address information of PDN GWh saved on HeNB and information about the ability of HeNB to support local route optimization. MME can acquire PDN GWh address and the ability of HeNB to support local route optimization, according to the initial UE message in the attaching process.

705 according to the NAS message, MME neglects the proposed Method 1 or 2 or 3 if NAS message is a network attach request, or it searches PDN GW address according to Method 1 or 2 or 3 or 4 if NAS message is PDN activation request or other NAS message and it contains local route optimization service indicated by APN.

Figure 8:
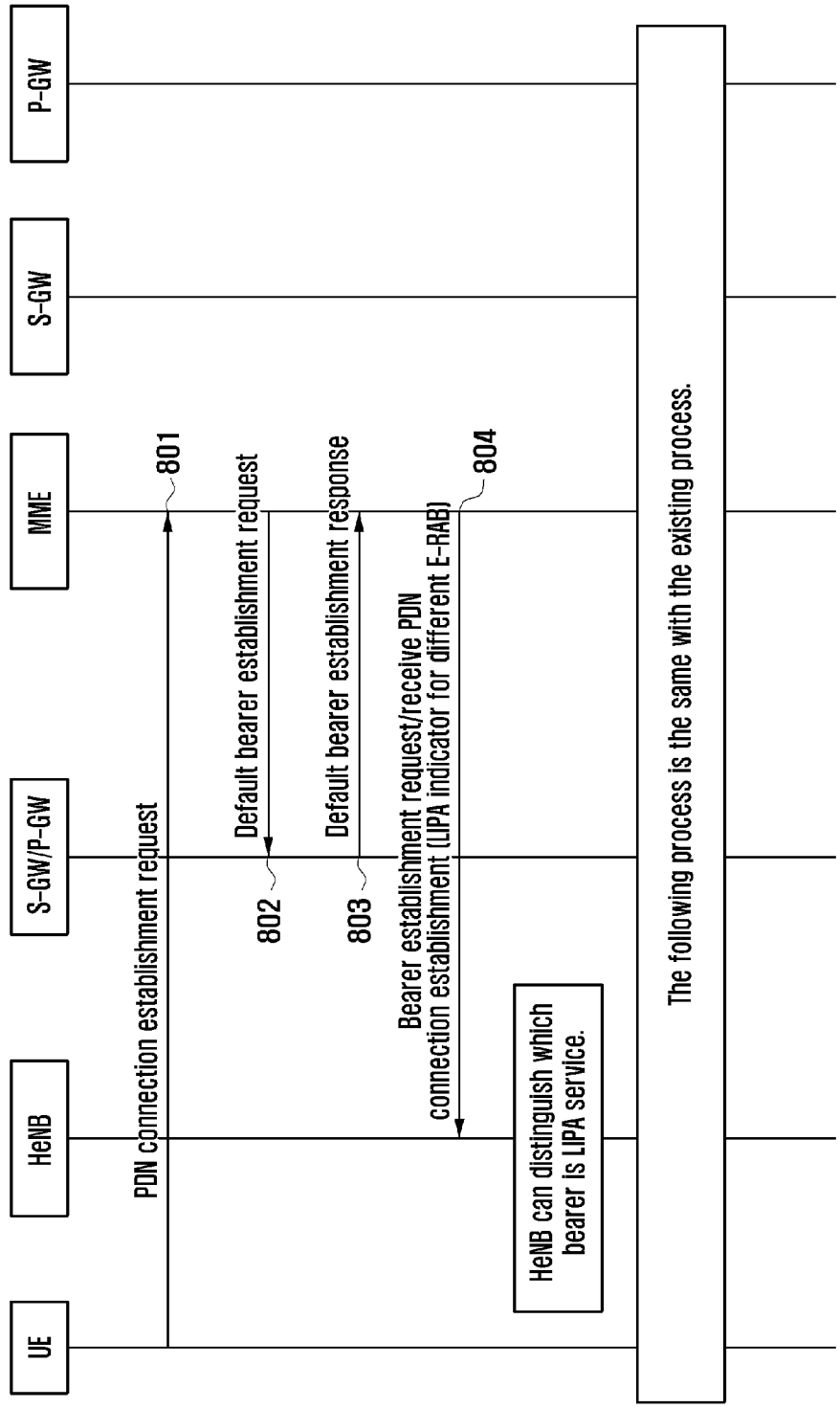
FIG. 8 shows Embodiment 6: PDN connection establishment process.

Embodiment 6 of the invention shows a PDN connection establishing processes. As shown in FIG. 8, detailed technical description of technology unrelated to the present invention is omitted in the following.

801-803 are processes executed according to methods in Embodiments 1 to 4.

804 MME can distinguish which bearer supports the local route optimization service, so it carries identification information which identifies which bearer supports local route optimization service in its response to bearer establishment request accepting PDN connection establishment. If multiple bearers are established to support local route optimization service, each bearer should add the identification information about supporting local route optimization service.

Furthermore, HeNB can distinguish multiple bearers on it and which of those bearers supports local route optimization service.

Such embodiment is applicable to transferring UE from HeNB to other areas, and it can guarantee effective release of bearers that support local route optimization service and non release of bearers that don't support local route optimization service as well.

Embodiment 7 of the invention shows a PDN connection establishing processes. As shown in FIG. 9, detailed technical description of technology unrelated to the present invention is omitted in the following.

Embodiment 7 describes processes of MME determining whether or not to permit the UE to access local route optimization service according to whether HeNB is capable of supporting local route optimization service.

901. Processes of RRC connection establishment.

901a. UE sends a NAS message to HeNB via uplink direct transmission.

902. HeNB sends an uplink direct transmission message carrying information about whether it supports local route optimization service to HeNB GW. Said uplink direct transmission message can be sent via current uplink transmission and a new S1 message. If UE executes the attaching process first, and then multi-PDN connection process in order to activate local route optimization service, HeNB sends a message via uplink direct transmission to MME during the process. The message can contain information indicating whether the HeNB is capable of supporting local route optimization.

903. HeNB GW sends the message which carries information indicating whether the HeNB is capable of supporting local route optimization to MME. This message can be transmitted both through the existing message via uplink direct transmission and a new S1. If there is a scenario of no HeNB GW deployed, the initial UE message will be directly sent to MME through HeNB GW, rather than being forwarded through it. If UE implements multi-PDN connection process prior to the attaching process to activate local route optimization service, the HeNB will send the message via uplink direct transmission to MME in this step. The message can contain the information indicating whether the HeNB is capable of supporting local route optimization.

904. For this UE, after S1 connection is successfully established, MME receives NAS message requesting for establishing PDN connection. The NAS message requesting for establishing PDN connection functions as a request message for activating local route optimization service.

905. If the HeNB is incapable of supporting the local route optimization,

905b. MME replies the UE's request for PDN connection. This reply message includes the reason for UE access-rejection to the local route optimization service, for example, HeNB does not support the local route optimization service. UE can be reaccessed according to a common service.

If HeNB is capable of supporting the local route optimization service,

MME will search PDN GW for UE according to the above method described in Embodiments 1, 2, 3 and 4.

Figure 10:
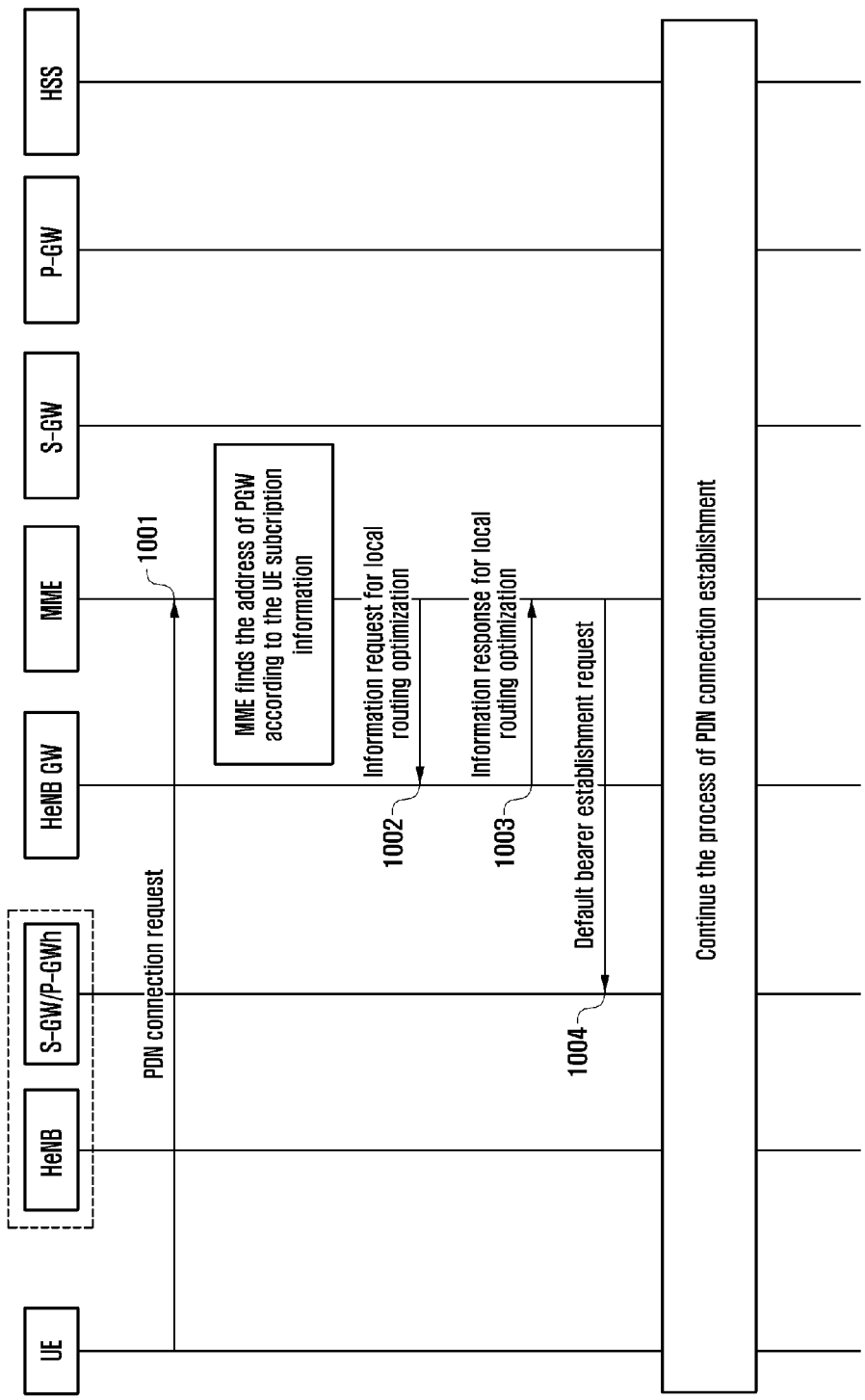
FIG. 10 shows Embodiment 8: PDN connection establishment process.
Figure 11:
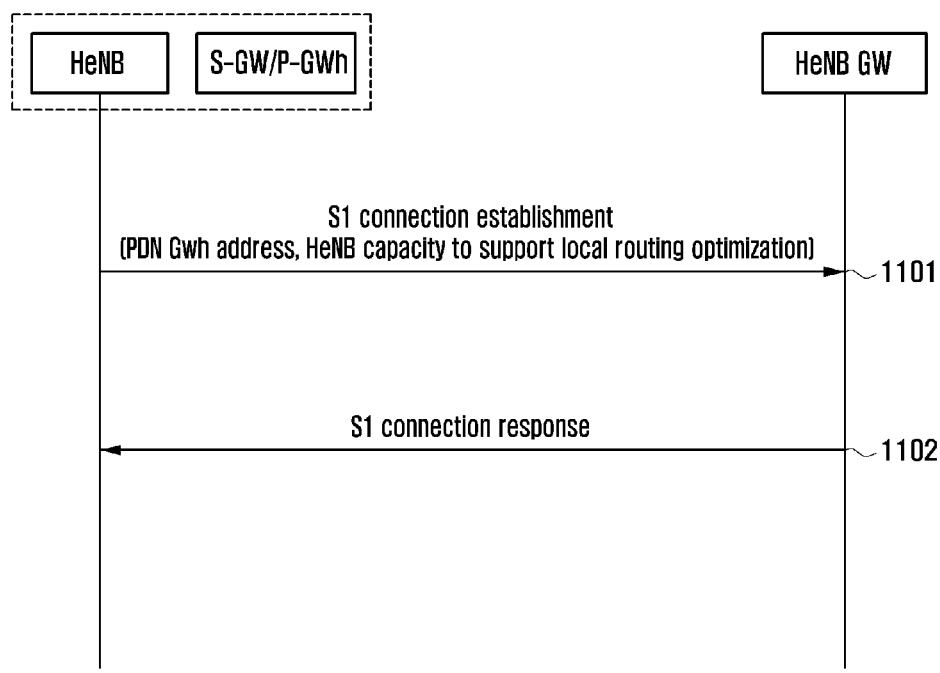
FIG. 11 shows Embodiment 8: S1 establishment process.
Figure 12:
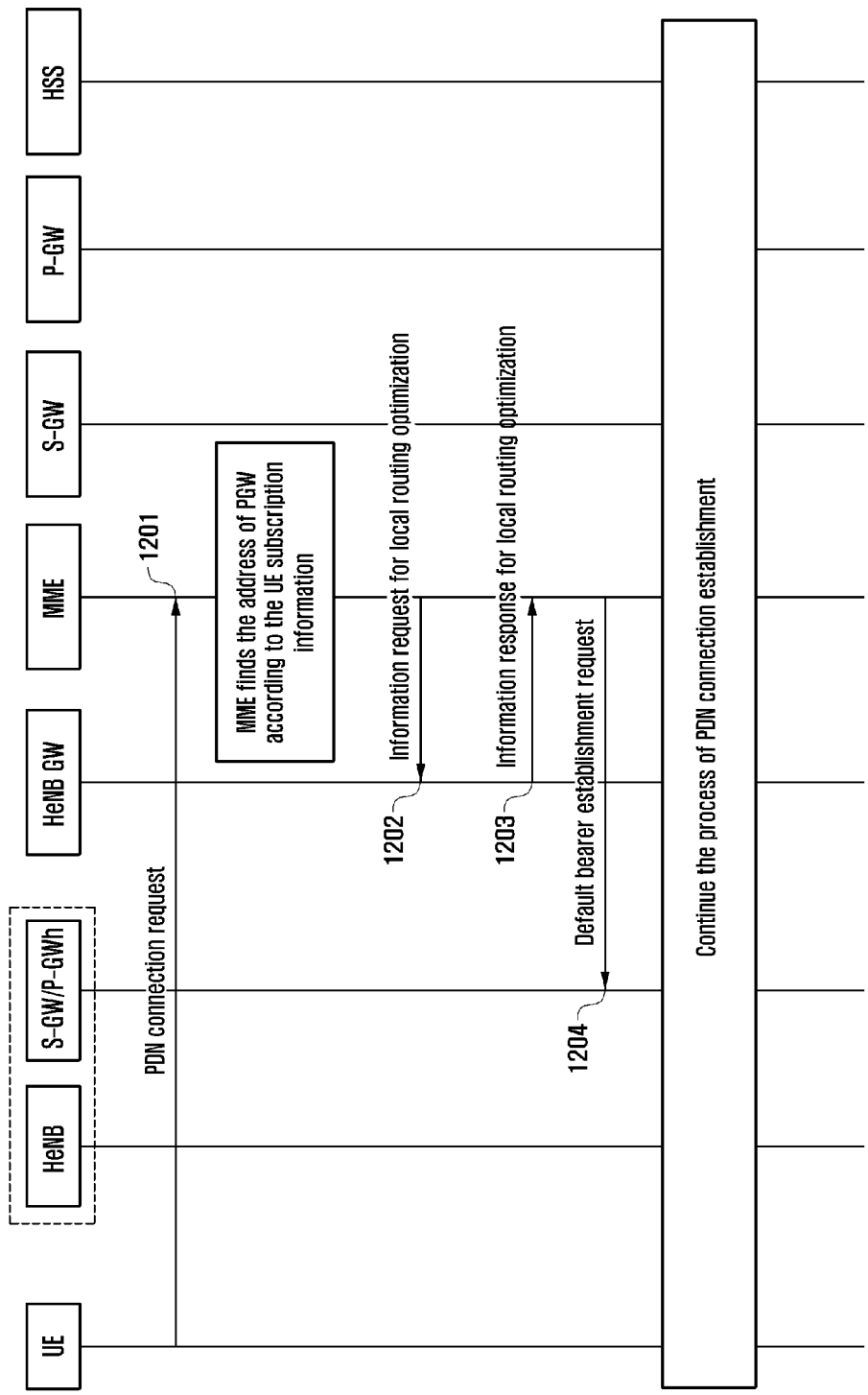
FIG. 12 shows Embodiment 8: PDN connection establishment process.

Embodiment 8 of the present invention describes the PDN connection establishment process. As illustrated in FIGS. 10, 11 and 12, the detailed description of technology unrelated to the present invention are omitted.

This Embodiment is also a method for supporting local route optimization-enabled PDN GW search. (Method 4)

This Embodiment can be applied in two situations:

Situation 1: PDN GWh and HeNB have the same IP addresses. PDN connection process is shown in FIG. 10.

Situation 2: PDN GWh and HeNB have different IP addresses. S1 and PDN connection processes are shown in FIGS. 11 and 12, respectively.

1001. UE sends a PDN connection request. The NAS message requesting for establishing PDN connection functions as a request message for activating local route optimization service.

1002. MME searches for the address of a PDN GW capable of supporting the local route optimization for UE according to the message carried by the UE's PDN connection request or the user's subscription message.

If the PDW GWh and the HeNB have the same IP addresses in the condition that an HeNB GW is deployed, the connected HeNB address will be stored on the HeNB GW. MME directly sends the S1 local route optimization message to HeNB GW after receiving the PDN connection request for activating the local route optimization service. It requests for acquiring the PDN GWh address and the HeNB's capability of supporting local route optimization.

If the HeNB and the PDN GWh have the same IP addresses in the condition that there is no HeNB GW deployed, the HeNB's IP address information is unnecessary for sending, since it is stored on the MME. The local route optimization supporting capability of the HeNB is acquired as shown in FIG. 11 through S1 establishing process.

1003. HeNB GW sends a local route optimization response message to MME. The response message contains PDN GWh address information and the HeNB's supporting capability to local route optimization.

1004. MME sends a default bearer establishment request message according to the acquired PDN GWh address.

When the HeNB and the PDN GWh have different IP addresses in the situation two,

1101. HeNB sends a S1 connection establishment message carrying the PDN GWh address to HeNB GW. HeNB GW will save the corresponding relationship between the address information and the HeNB.

In the message, HeNB also can send information indicating whether it is capable of supporting local route optimization to HeNB GW. HeNB GW will also save the corresponding relationship of local route optimization supporting capabilities between HeNBs.

In the condition that the HeNB GW is deployed, during the S1 establishment process from HeNB GW to MME, it is unnecessary to send the message carrying PDN GWh address information or the information indicating whether HeNB supports local route optimization to MME, but merely storing the above corresponding relationship on HeNB GW.

On the contrary, the S1 connection establishment message sent to MME from the HeNB needs to carry the PDN GWh address information or the information indicating whether HeNB supports local route optimization. MME have stored the corresponding relationships of the HeNB and the PDN GWh, and the local route optimization supporting capabilities of the HeNBs.

1201. UE sends a PDN connection request to MME. The NAS message requesting for establishing PDN connection functions as a request message for activating local route optimization service.

MME searches for the address of a PDN GW capable of supporting the local route optimization for UE, according to the information carried by the UE's PDN connection request or subscription message.

If MME hasn't stored the corresponding relationship of the HeNB and the PDN

GWh or the corresponding relationship of the local route optimization supporting capabilities of the HeNBs, 1202. the MME will send the S1 local route optimization request message to HeNB GW so as to acquire PDN GWh address information or HeNB capability information from the HeNB GW.

If MME has stored the corresponding relationship between the HeNB and the PDN GWh or the corresponding relationship between the local route optimization supporting capabilities of the HeNBs and the HeNBs, for example, there is no HeNB GW deployed, it is unnecessary for MME to implement the steps of 1202 and 1203.

1203. HeNB GW sends local route optimization response message to MME. The message contains PDN GWh address information or information indicating whether HeNB is capable of supporting local route optimization. Or the two types of information are both responded.

1204. MME sends a default bearer establishment request according to the acquired PDN GWh.

MME can decide whether to continue PDN connection process according to HeNB's capability message. For detailed process, please refer to Embodiment 7 and FIG. 9.

Although the invention is described by example of the above embodiments, all these embodiments are intended to illustrate, rather than limit, the present invention. Those skilled in the art could easily modify, add, delete any step of these embodiments without departing from the spirit and range of the present invention.

The invention claimed is:

1. A method for selecting a gateway by a mobility management entity (MME) in a wireless communication system supporting a local internet protocol access (LIPA), the method comprising:
   receiving, from a base station, a message related to a terminal;
   identifying, if an access point name (APN) related to the terminal is authorized for the LIPA according to subscription information, whether a connection corresponding to the message is authorized based on the subscription information;
   identifying whether the message comprises an address of a gateway collocated with the base station;
   selecting, if the connection is permitted based on the subscription information and the message comprises the address, a gateway using the address included in the message; and
   rejecting, if a permission of the connection requested by the terminal is set to LIPA, the connection based on the message.

2. The method of claim 1, wherein the address is included in an s1 message.

3. The method of claim 1, wherein the message is an initial ue message.

4. The method of claim 1, wherein the subscription information comprises at least one closed subscriber group identifier (CSG ID), the at least one CSG ID is used for authorizing the LIPA connection.

5. The method of claim 1, further comprising:
   transmitting, if the message to request the LIPA is rejected based on information included in the message and the APN corresponds to the LIPA, a response message to reject the message.

6. A method for supporting gateway selection by a base station in a wireless communication system supporting a local interne protocol access (LIPA), the method comprising:
   transmitting, to a mobility management entity (MME), a message related to a terminal; and
   receiving, from the MME, a response message in response to the message,
   wherein it is identified whether a connection corresponding to the message is authorized based on subscription information by the MME, if an access point name (APN) related to the terminal is authorized for the LIPA corresponding to the message,
   wherein it is identified whether the message comprises an address of a gateway collocated with the base station by the MME,
   wherein a gateway is selected using the address included in the message, if the connection is permitted based on the subscription information and the message comprises the address, and
   wherein the connection request by the terminal is rejected based on the message, if a permission of the connection requested by the terminal is set to LIPA.

7. The method of claim 6, wherein the address is included in an s1 message.

8. The method of claim 6, wherein the message is an initial ue message.

9. The method of claim 6, wherein the subscription information comprises at least one closed subscriber group identifier (CSG ID), the at least one CSG ID is used for authorizing the LIPA connection.

10. The method of claim 6, wherein the receiving the response message comprises:
    receiving, if the message to request the LIPA is rejected based on information included in the message and the APN corresponds to the LIPA, the response message to reject the message.

11. An apparatus for selecting a gateway in a wireless communication system supporting a local internet protocol access (LIPA), the apparatus comprising:
    a transceiver for transmitting and receiving a signal; and
    a controller configured to:
        receive, from a base station, a message related to a terminal,
        identify, if an access point name (APN) related to the terminal is authorized for the LIPA according to subscription information, whether a connection corresponding to the message is authorized based on the subscription information,
        identify whether the message comprises an address of a gateway collocated with the base station,
        select, if the connection is permitted based on the subscription information and the message comprises the address, a gateway using the address of the gateway included in the message, and
        reject, if a permission of the connection requested by the terminal is set to LIPA, the connection based on the message.

12. The apparatus of claim 11, wherein the address is included in an s1 message.

13. The apparatus of claim 11, wherein the first message is an initial ue message.

14. The apparatus of claim 11, wherein the subscription information comprises at least one closed subscriber group identifier (CSG ID), the at least one CSG ID is used for authorizing the LIPA connection.

15. The apparatus of claim 11, the controller is further configured to transmit, if the message to request the LIPA is rejected based on information included in the message and the APN corresponds to the LIPA, a response message to reject the message.

16. An apparatus for supporting gateway selection in a wireless communication system supporting a local internet protocol access (LIPA), the apparatus comprising:
    a transceiver for transmitting and receiving a signal; and
    a controller configured to:
        transmit, to a mobility management entity (MME), a message related to a terminal, and
        receive, from the MME, a response message in response to the message,
    wherein it is identified whether a connection corresponding to the message is authorized based on subscription information by the MME, if an access point name (APN) related to the terminal is authorized for the LIPA corresponding to the message,
    wherein it is identified whether the message comprises an address of a gateway collocated with the base station by the MME,
    wherein a gateway is selected using the address included in the message, if the connection is permitted based on the subscription information and the message comprises the address, and wherein the connection request by the terminal is rejected based on the message, if a permission of the connection requested by the terminal is set to LIPA.

17. The apparatus of claim 16, wherein the address is included in an s1 message.

18. The apparatus of claim 16, wherein the message is an initial ue message.

19. The apparatus of claim 16, wherein the subscription information comprises at least one closed subscriber group identifier (CSG ID), the at least one CSG ID is used for authorizing the LIPA connection.

20. The apparatus of claim 16, the controller is further configured to receive, if the message to request the LIPA is rejected based on information included in the message and the APN corresponds to the LIPA, the response message to reject the message.

* * * * *